US008899386B2

(12) United States Patent  
Baumgartner et al.

(10) Patent No.: US 8,899,386 B2  
(45) Date of Patent: Dec. 2, 2014

(54) PNEUMATICALLY ACTUABLE DISC BRAKE

(75) Inventors: Johann Baumgartner, Moosburg (DE); Robert Gruber, Pfaffing (DE); Aleksandar Pericevic, Munich (DE); Steffen Geissler, Rodgau (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 511 days.

(21) Appl. No.: 13/017,566

(22) Filed: Jan. 31, 2011

(65) Prior Publication Data

US 2011/0209951 A1    Sep. 1, 2011

Related U.S. Application Data

(63) Continuation of application No. PCT/EP2009/005563, filed on Jul. 31, 2009.

(30) Foreign Application Priority Data

Aug. 1, 2008  (DE) .................. 10 2008 036 033

(51) Int. Cl.

| F16D 55/08 | (2006.01) |
|---|---|
| F16D 65/18 | (2006.01) |
| F16D 127/10 | (2012.01) |
| F16D 121/14 | (2012.01) |
| F16D 125/32 | (2012.01) |

(52) U.S. Cl.

CPC ............ F16D 65/18 (2013.01); *F16D 2127/10* (2013.01); *F16D 2121/14* (2013.01); *F16D 2125/32* (2013.01)

USPC ........ 188/72.9; 188/72.2; 188/72.5; 188/70 B

(58) Field of Classification Search

USPC .......... 188/72.9, 72.2, 72.7, 70 B, 71.7, 72.5, 188/73.1, 73.34

See application file for complete search history.

(56) References Cited

U.S. PATENT DOCUMENTS

| 4,022,300 A | * | 5/1977 | Afanador et al. ............ 188/72.1 |
| 6,899,204 B2 | * | 5/2005 | Baumgartner et al. ...... 188/72.9 |

(Continued)

FOREIGN PATENT DOCUMENTS

| DE | 198 55 614 C1 | 7/2000 |
| DE | 10 2005 006 264 A1 | 6/2006 |

(Continued)

OTHER PUBLICATIONS

German Office Action dated Jul. 31, 2009 with English translation (eight (8) pages).

(Continued)

*Primary Examiner* — Melanie Torres Williams  
(74) *Attorney, Agent, or Firm* — Crowell & Moring LLP

(57) ABSTRACT

A pneumatic disc brake has a caliper which straddles a brake disc, brake pads pressable against the brake disc, wherein a brake-application-side brake pad can be actuated by a brake lever of a brake application device pivotable about an eccentric axis. Against the end side, the brake lever bears a brake ram which is coupled at the other side to the brake pad or to a guide plate coupled thereto. Two pressure rams are aligned in the same direction and spaced apart from the brake ram. The pressure rams are connected in each case to the caliper and to the brake pad or to the guide plate and have a self-energizing device. The caliper has spherical-cap-shaped bearing receptacles in which rest corresponding plain bearing elements, by which the brake lever, and the pressure rams are supported on the caliper.

12 Claims, 4 Drawing Sheets

(56) References Cited

U.S. PATENT DOCUMENTS

| | | | |
|---|---|---|---|
| 7,815,021 B2 * | 10/2010 | Baumgartner et al. | ...... 188/72.9 |
| 7,958,974 B2 * | 6/2011 | Baumgartner et al. | ...... 188/72.2 |
| 2004/0026181 A1 | 2/2004 | Baumgartner et al. | |
| 2009/0192690 A1 | 7/2009 | Baumgartner et al. | |
| 2009/0194377 A1 | 8/2009 | Baumgartner et al. | |
| 2009/0258119 A1 | 10/2009 | Nevalainen et al. | |
| 2011/0005871 A1 | 1/2011 | Pericevic et al. | |

FOREIGN PATENT DOCUMENTS

| | | |
|---|---|---|
| DE | 10 2006 029 942 A1 | 8/2007 |
| DE | 10 2006 036 278 B3 | 10/2007 |
| DE | 10 2007 001 960 A1 | 7/2008 |
| DE | 10 2008 004 806 A1 | 7/2009 |
| EP | 0 553 105 B1 | 8/1993 |
| EP | 1 230 491 B1 | 8/2002 |
| WO | WO 02/059494 A1 | 8/2002 |
| WO | WO 2006/042621 A1 | 4/2006 |
| WO | WO 2007/082658 A1 | 7/2007 |

OTHER PUBLICATIONS

International Search Report dated Oct. 29, 2009 with English translation (eight (8) pages).

* cited by examiner

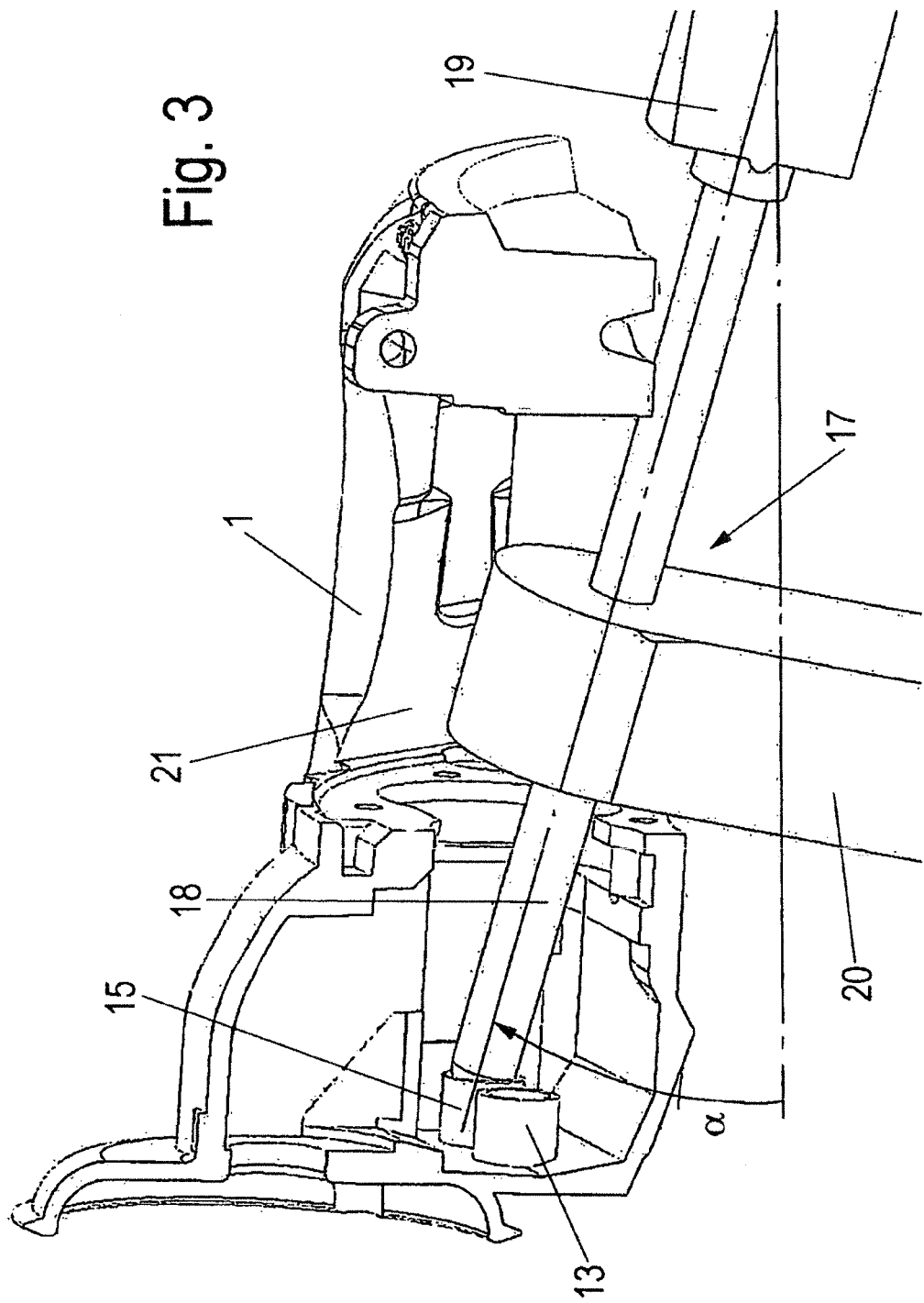

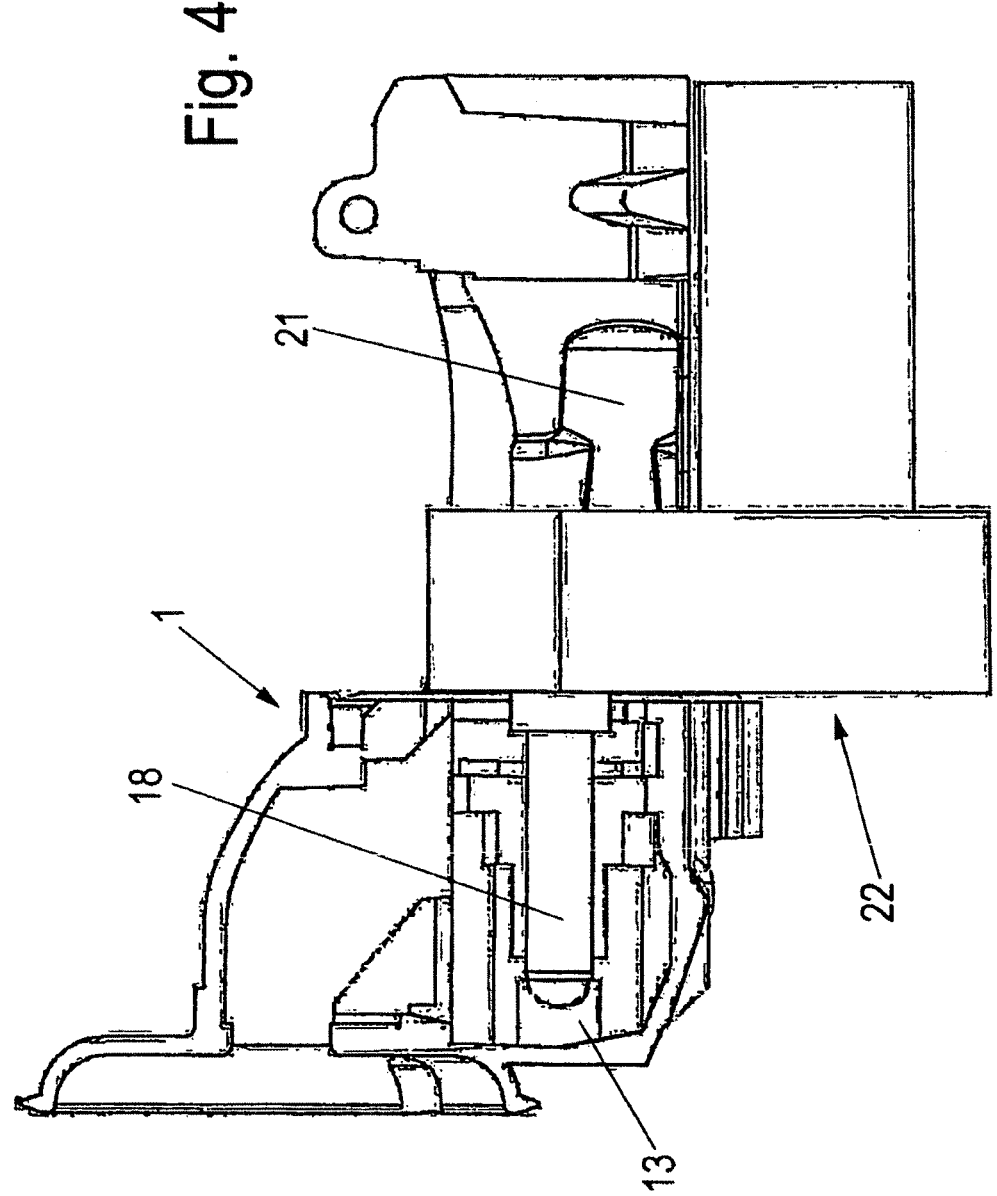

PNEUMATICALLY ACTUABLE DISC BRAKE

CROSS-REFERENCE TO RELATED APPLICATIONS

This application is a continuation of PCT International Application No. PCT/EP2009/005563, filed Jul. 31, 2009, which claims priority under 35 U.S.C. §119 from German Patent Application No. DE 10 2008 036 033.3, filed Aug. 1, 2008, the entire disclosures of which are herein expressly incorporated by reference.

This application contains subject matter related to U.S. application Ser. No. 13/017,580, entitled "Pneumatically Actuable Disc Brake," filed on even date herewith.

BACKGROUND AND SUMMARY OF THE INVENTION

The invention relates to a pneumatically actuatable disc brake having a caliper straddling a brake disc, brake pads which are able to be pressed against the brake disc on both sides, wherein one of the brake pads on a brake application side is able to be actuated by use of a brake lever of a brake application device which may be pivoted about an eccentric axis and against which a brake ram bears on the front face.

Such a pneumatically actuatable disc brake is disclosed, for example, in EP 0 553 105 B1 and EP 1 230 491 B1.

In this connection, the brake lever which is formed at one end as an eccentric is supported on the brake caliper as an abutment. Due to the relatively large pivot angle of the brake lever, required by its operation, correspondingly high friction losses of the eccentric bearing arrangement are present. For the reduction of these friction losses, therefore, rolling bearing half-shells are used which enclose the eccentric bearing arrangement.

However, the production of such rolling bearings is only possible by a very complex manufacturing process, with correspondingly high production costs.

In addition, such a rolling bearing arrangement is naturally relatively susceptible to failure, which hinders an optimized service life.

It is proposed, therefore, in the aforementioned EP 1 230 491 B1, to use plain bearings exclusively for mounting the brake lever on the caliper. The plain bearings are characterized by a particularly high degree of robustness, in addition to low production costs. However, the coefficients of friction of the maintenance-free plain bearings used are many times above the roll resistance value of the rolling bearings, which naturally has an effect on the provision of a braking force to be applied by the brake cylinder.

For optimizing the pneumatically actuated disc brake, therefore, it is proposed in DE 10 2008 004 806, which is not pre-published, to provide the disc brake with a self-energizing device, which has a self-energizing factor selected so that the brake is automatically released after braking.

By this measure, the stroke of a brake cylinder, by which the brake lever may be actuated by an attached plunger, may be substantially shorter, naturally resulting in a reduction of the pivot angle of the brake lever, due to the reduction of the coefficient of friction of the pivot bearing.

Thus, a pressure ram is attached to the brake lever, the pressure ram moving in the axial direction of the brake disc when the brake lever is rotated and pressing the brake pad attached on the brake application side against the brake disc.

For supporting the brake pad and for producing the self-energizing device, viewed in the peripheral direction of the brake disc, a pressure ram is arranged in each case on both sides of the brake ram. The pressure rams are mounted, on the one hand, on the caliper and, on the other hand, corresponding to the brake pad. Moreover, the pressure rams, in cooperation with a wear adjusting device, serve to compensate for clearance as a result of wear.

In EP 1 230 491 B1 discussed above, for producing the plain bearing arrangement of the brake lever in the caliper, spherical cap-shaped bearing receptacles are provided, in which bearing elements in the form of balls engage which, on the other hand, are supported on the brake lever.

For machining the bearing receptacles it is necessary to form the caliper in two parts and to screw the two halves of the caliper together after machining. This screw connection, however, represents a potential weak point as the screws have to absorb the forces acting on the caliper.

The introduction of through-bores and threaded bores, and the provision of the screws themselves, represent a factor which has a negative effect on production costs, which is of particular importance, in particular with regard to the fact that disc brakes are mass-produced items which are used in large numbers.

The object of the invention, therefore, is to develop a disc brake of the above-described type so that it may be produced more easily and more cost-effectively, and so that its operational reliability is permanently improved.

This and other objects are achieved by a disc brake having a caliper straddling a brake disc, brake pads which are able to be pressed against the brake disc on both sides, wherein one of the brake pads on a brake application side is able to be actuated by use of a brake lever of a brake application device which may be pivoted about an eccentric axis and against which a brake ram bears on the front face. The brake ram, on the other hand, is coupled to the brake pad on the brake application side or a guide plate connected thereto. Two pressure rams are aligned with the brake ram and arranged at a distance therefrom, which in each case are attached to the caliper and coupled to the brake pad or the guide plate. A self-energizing device is also provided. The caliper includes spherical cap-shaped bearing receptacles, in which plain bearing elements adapted thereto engage, via which the brake lever and the pressure rams are supported on the caliper at a side remote from the brake pad.

With this structural design, the spherical cap-shaped bearing receptacles may be dimensioned to be so small that a suitable machining tool may be introduced into a one-piece caliper design.

Thus the machining tools, generally machining spindles, have to be guided obliquely relative to the rotational axis of the brake disc. In order to keep the corresponding angle still within additional limits in the sense of accurate machining, the caliper back is expediently designed so that a sufficient free passage is provided for the machining spindle without loss of strength.

By the spherical cap-shaped design of the bearing receptacles, when using a suitable tool a substantially free angular position of the rotational axis of the machining spindle may be selected. Above all, therefore, this is particularly advantageous as concentric guidance of the machining spindle is not possible through the caliper back, as otherwise the caliper back would be reduced in its strength in an unacceptable manner by the corresponding through-holes.

The self-energizing device which encompasses a guide plate, to which the brake pad is fastened, as well as a wedge system, requires a larger sized shaft of the brake, relative to a disc brake without self-energization, which promotes the insertion of the machining tool into the interior of the caliper.

Instead of an obliquely guided machining spindle, the spherical cap-shaped bearing receptacles may also be machined by driven angular milling heads, so that a coaxial machining of the bearing receptacles is possible.

Although, as mentioned above, the size of the shaft of the brake caliper is increased by the use of the self-energizing device, the overall space requirement of the disc brake, viewed in the direction of the brake disc axis, is reduced by the now reduced stroke of the brake cylinder and the reduced pivot angle of the brake lever.

According to an advantageous development of the invention, the pressure ram(s), the brake ram and the wear adjustment device, including a synchronization device for the synchronous adjustment of the wear, together with a base plate abrading the mounting opening of the caliper and the guide plate, are combined to form a structural unit.

The pressure ram is coupled to the brake pad so that small pivoting movements of the pressure ram are possible, corresponding to the peripheral displacement of the brake pad occurring when the brake is actuated.

Simple releasability of the coupling of the pressure ram to the brake pad, which is required in the event of maintenance, is preferably provided via a snap connection, for example in the form of a spring washer received in a groove of the brake ram, which at high tensile forces, as are required for releasing the connection when changing the pad, is forced back from an annular oblique shoulder on the brake pad completely into the groove, so that the two components, the brake ram/brake pad, are separated.

Instead of being provided in the pressure ram, the groove for receiving the spring washer may also be provided on the brake pad, in particular a pad carrier plate of the brake pad, whilst the annular oblique shoulder is provided on the associated component.

The return force required for releasing this connection is considerably greater, preferably many times greater, than the spring force of the return spring in order to prevent the connection from being inadvertently released.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2 to 4 are sectional views showing, in each case, a caliper according to the invention during a machining operation.

DETAILED DESCRIPTION OF THE DRAWINGS

Figure 1:
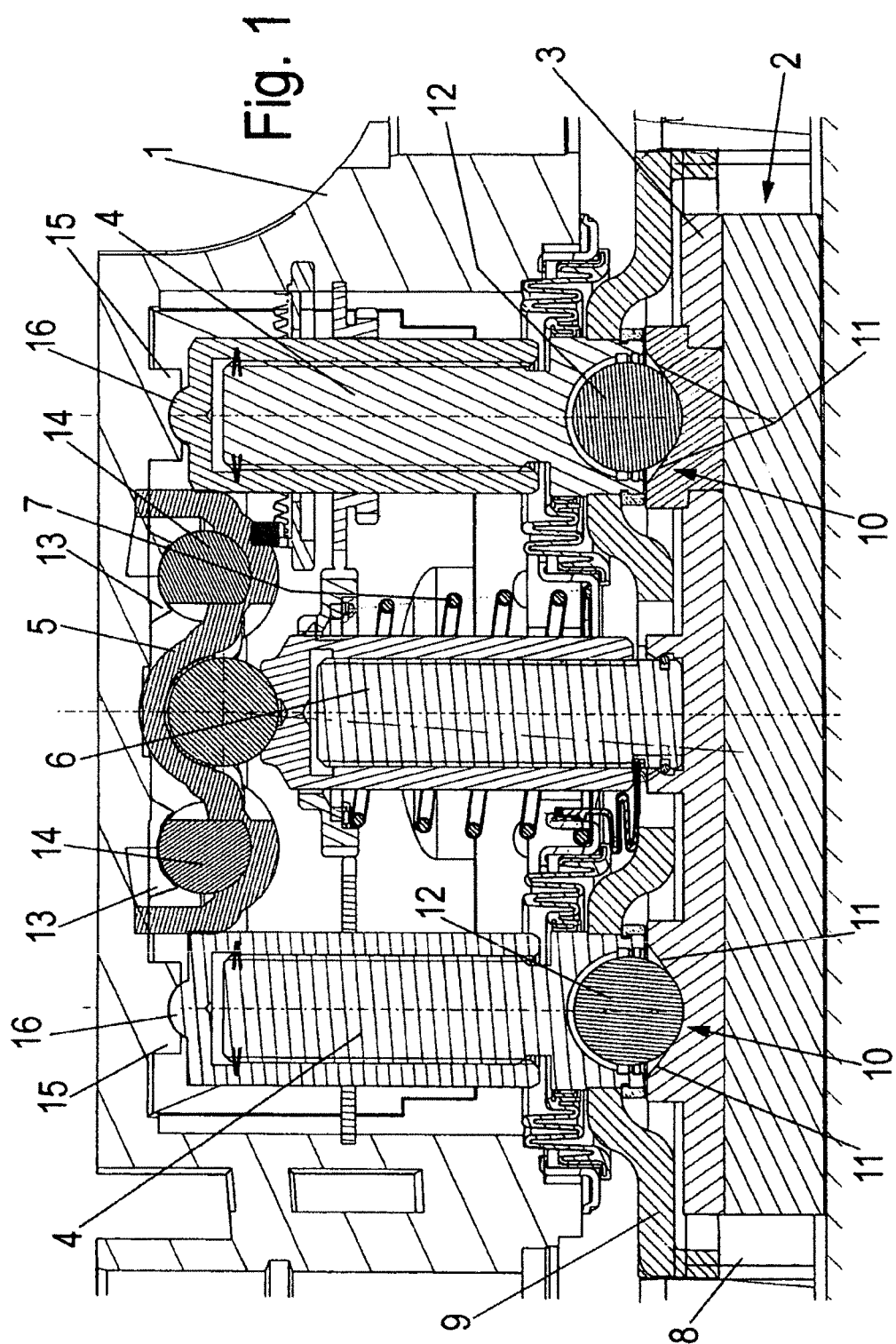
FIG. 1 is a sectional plan view showing a partial detail of an exemplary disc brake according to the invention.

In FIG. 1 a self-energizing disc brake is shown with a caliper 1 held on a fixed brake carrier 8, a brake pad 2 on a brake application side and a brake pad on a reaction side, which are able to be pressed against a brake disc. In the example, only the brake pad 2 on the brake application side is shown.

For applying the brake, a brake application device is provided having a rotary lever 5 and a brake ram 6, via which the brake pad 2 may be moved in the axial direction, relative to the rotational axis of the brake disc.

Furthermore, a self-energizing device is provided, which has split bearings 10, to which in each case a pressure ram 4 is associated. The pressure rams 4 are in engagement with a wear adjustment device for adjusting the brake pad 2 as a result of wear. The pressure rams 4 are held by their end region facing the brake pad 2 in a guide plate 9, which may be displaced in the brake application direction in the brake carrier 8.

Each split bearing 10 has a bearing ball 12 incorporated on the front face in the associated pressure ram 4 and which, on the other hand, engages in a spherical cap-shaped recess of the brake pad 2, the side wall thereof being formed in the sense of inclined ramps H.

During braking, in other words when the brake pad 2 is pressed against the brake disc by means of the brake lever 5, tangential forces are produced by which the brake pad 2 is displaced in the rotational direction of the brake disc, by altering the spacing relative to the pressure ram 4.

When releasing the brake, the brake pad 2 is moved back by a return spring 7 into a so-called relaxed initial position, in which the bearing ball 12 engages practically without function in the recess of the brake pad.

The brake lever 5 is able to be rotated toward the brake ram 6 about an eccentric rotational axis which is formed by two spherical bearing elements 14, which, on the one hand, engage in spherical caps (pockets) of the brake lever 5 and, on the other hand, in spherical cap-shaped bearing receptacles 13 of the caliper 1.

The pressure rams 4, viewed in the peripheral direction of the brake disc, arranged on both sides adjacent to the brake ram 6, are mounted on their front face remote from the brake pad 2 in spherical cap-like bearing receptacles 15 of the caliper 1. A plain bearing element 16 configured in the sense of a ball portion is integrally formed on the associated front faces of the pressure rams 4. The plain bearing element engages in the bearing receptacle 15. Instead of the integrally formed plain bearing element 16, a separate spherical plain bearing element may also be provided which then engages in a correspondingly formed recess of the pressure ram 4, comparable to the opposing bearing ball 12 in the region of the split bearing 10.

The bearing receptacles (receivers) 13, 15 which are located on the same surface of the caliper 1, which is denoted in this region as the caliper head, are preferably incorporated in cast projections when the integral caliper 1 is formed as a cast part.

Figure 2:
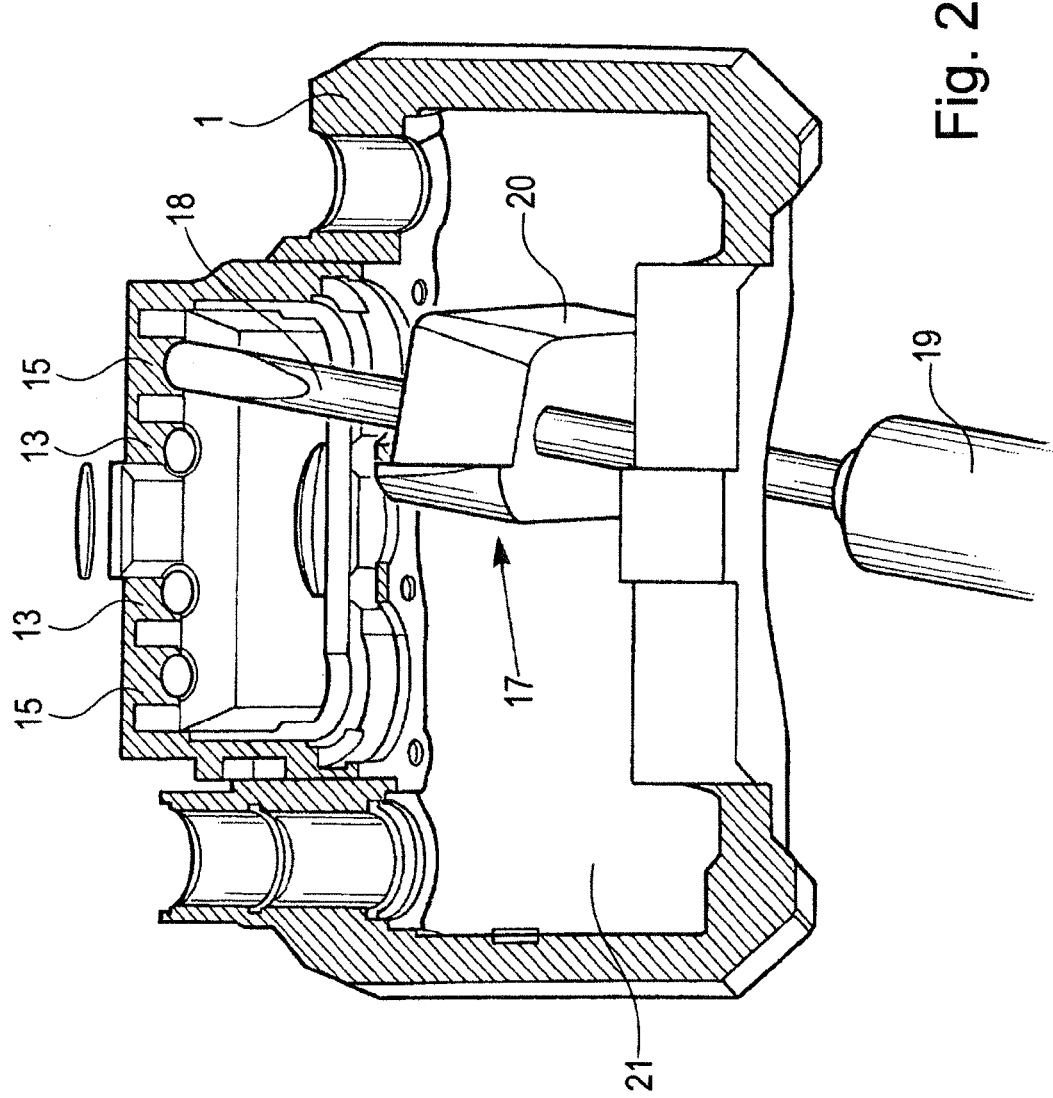

The machining of the respective spherical cap-like recess of the bearing receptacles 13, 15, as shown in FIGS. 2 and 3, is able to be carried out by use of a machining tool 17, which has a machining spindle 18 guided obliquely from below through a shaft 21 of the caliper 1 and with a cutting head in the shape of a spherical segment, with which the spherical cap-shaped recess of the bearing receptacles 13, 15 may be machined.

The machining spindle 18 is driven via a drive 19 and supported by way of a guide part 20 which protrudes into the shaft 21.

While FIG. 2 shows a sectional plan view of the caliper, FIG. 3 shows a sectional side view. In both cases, however, the machining spindle 18 is inserted obliquely, which permits the spherical cap-shaped configuration of the bearing receptacles 13, 15.

A further variant of the machining process is visible in FIG. 4. In this case, an angular drive 22 is provided as the machining tool, through which the machining spindle 18 may be coaxially guided. In this case, the angular drive 22 may be inserted from below through the shaft 21 into the caliper 1.

TABLE OF REFERENCE NUMERALS

1 Caliper
2 Brake pad

3 Pad pressure plate
4 Pressure ram
5 Brake lever
6 Brake ram
7 Return spring
8 Brake carrier
9 Guide plate
10 Split bearing
11 Ramp
12 Bearing ball
13 Bearing receptacle
14 Plain bearing element
15 Bearing receptacle
16 Plain bearing element
17 Machining tool
18 Machining spindle
19 Drive
20 Guide part
21 Shaft
22 Angular drive The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatic disc brake for use with a brake disc, comprising:
   a caliper for straddling the brake disc, the caliper comprising spherical cap-shaped bearing receptacles in an interior thereof;
   a brake application device arranged in the caliper, the brake application device having a brake lever pivotable about an eccentric axis against a brake ram for displacing a brake application side brake pad against the brake disc;
   two pressure rams aligned with the brake ram and spaced apart from the brake ram;
   a self-energizing mechanism operatively configured with respect to the two pressure rams;
   plain bearing elements adapted to engage in the spherical cap-shaped bearing receptacles, the spherical cap-shaped bearing receptacles and plain bearing elements supporting the brake lever and the two pressure rams on the caliper on a side of the brake lever and the two pressure rams that faces away from the brake disc,
   wherein a snap connection is provided between the brake ram and the brake pad.

2. The pneumatic disc brake according to claim 1, wherein the caliper is formed in one-piece.

3. The pneumatic disc brake according to claim 1, wherein the spherical cap-shaped bearing receptacles are incorporated into projections formed integrally with the caliper.

4. The pneumatic disc brake according to claim 2, wherein the spherical cap-shaped bearing receptacles are incorporated into projections formed integrally with the caliper.

5. The pneumatic disc brake according to claim 1, wherein the caliper comprises four spherical cap-shaped bearing receptacles, two of said bearing receptacles being configured for supporting the brake lever and one of said bearing receptacles being configured for each of the pressure rams.

6. The pneumatic disc brake according to claim 4, wherein the caliper comprises four spherical cap-shaped bearing receptacles, two of said bearing receptacles being configured for supporting the brake lever and one of said bearing receptacles being configured for each of the pressure rams.

7. The pneumatic disc brake according to claim 1, wherein the plain bearing elements for supporting the brake lever are bearing balls.

8. The pneumatic disc brake according to claim 5, wherein the plain bearing elements for supporting the brake lever are bearing balls.

9. The pneumatic disc brake according to claim 1, wherein the plain bearing elements for the two pressure rams are formed by a spherical-shaped portion of an associated front face of a respective pressure ram.

10. The pneumatic disc brake according to claim 5, wherein the plain bearing elements for the two pressure rams are formed by a spherical-shaped portion of an associated front face of a respective pressure ram.

11. The pneumatic disc brake according to claim 1, wherein the plain bearing elements for supporting the pressure rams are bearing balls.

12. The pneumatic disc brake according to claim 5, wherein the plain bearing elements for supporting the pressure rams are bearing balls.

\* \* \* \* \*